Patented July 6, 1943

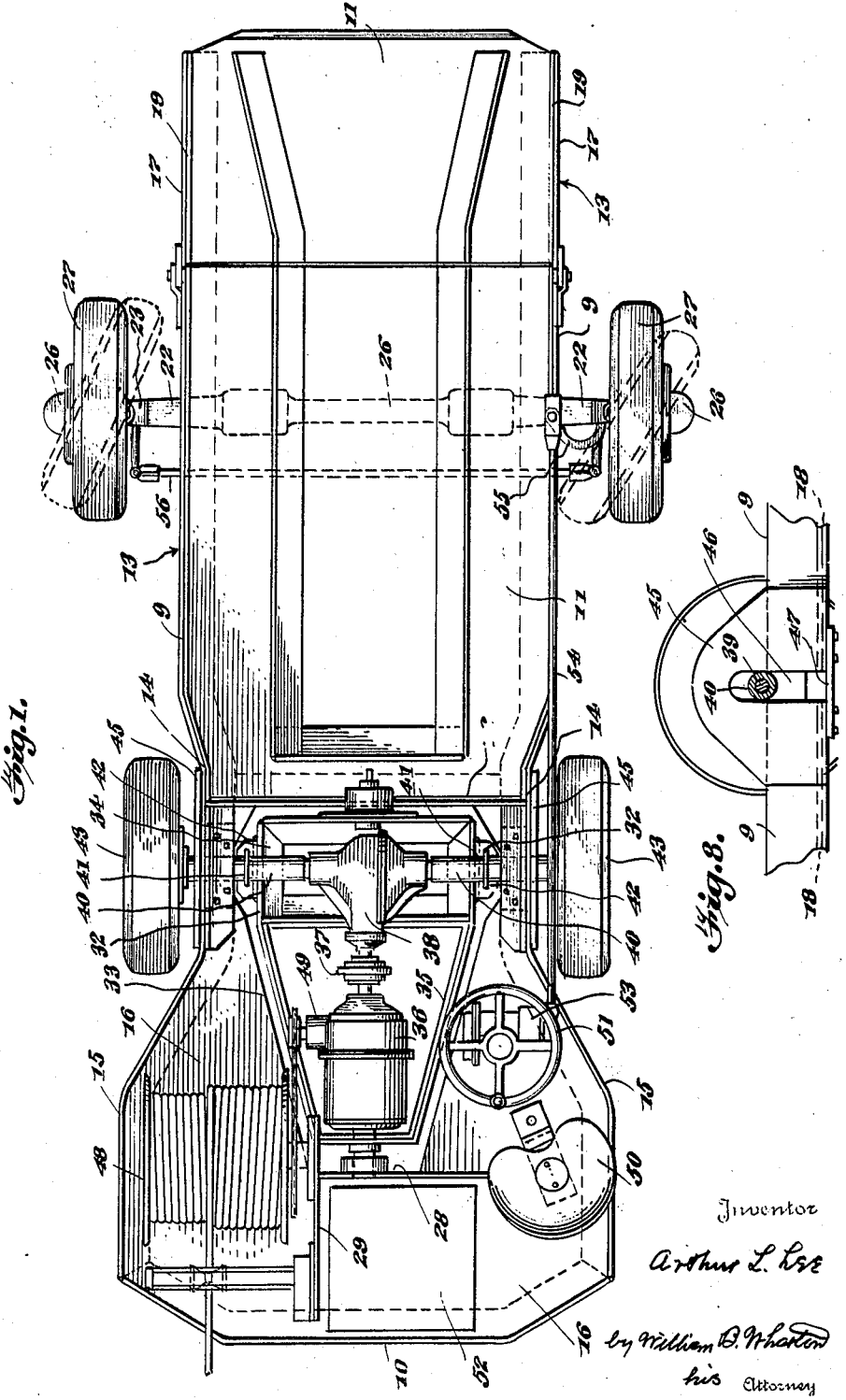

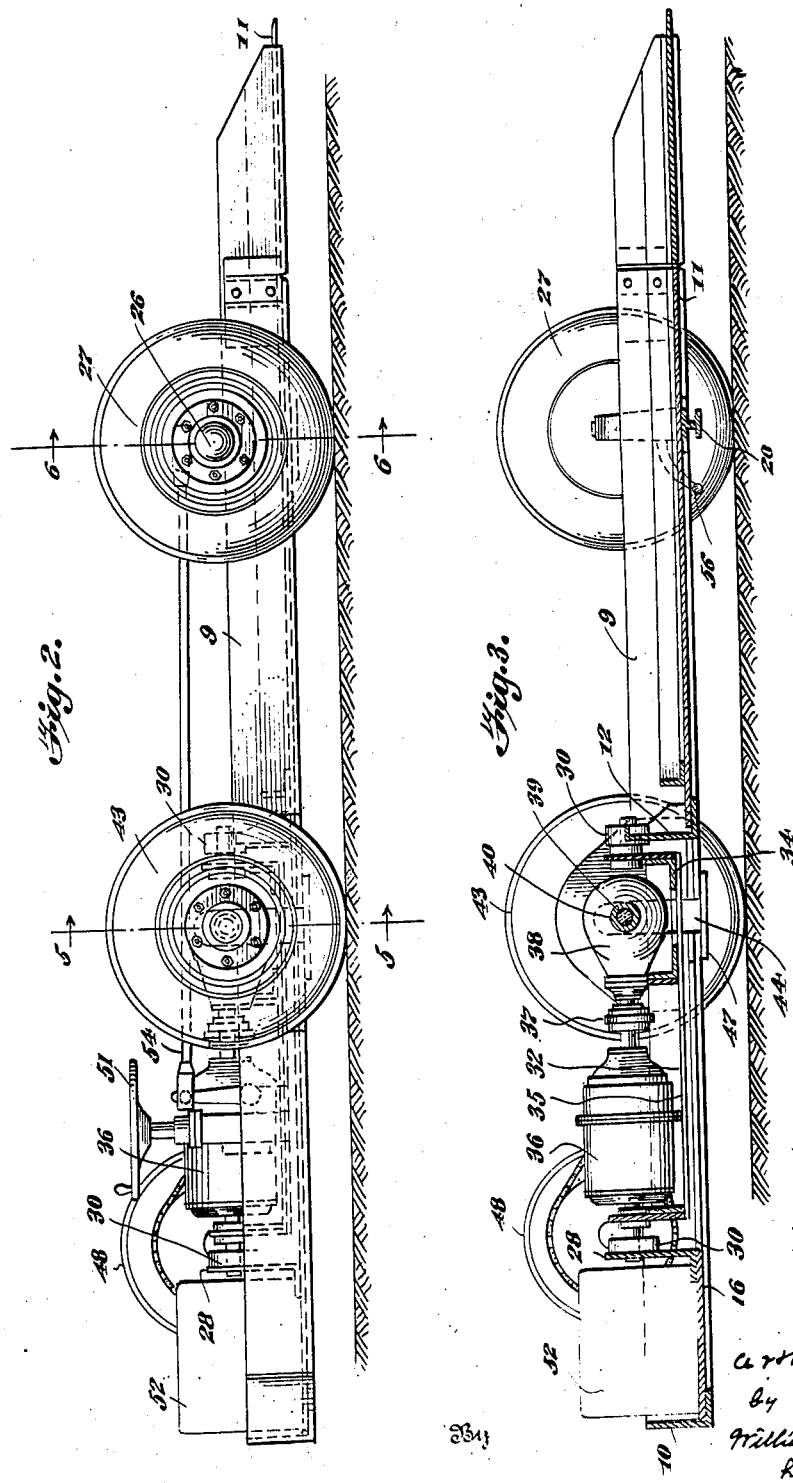

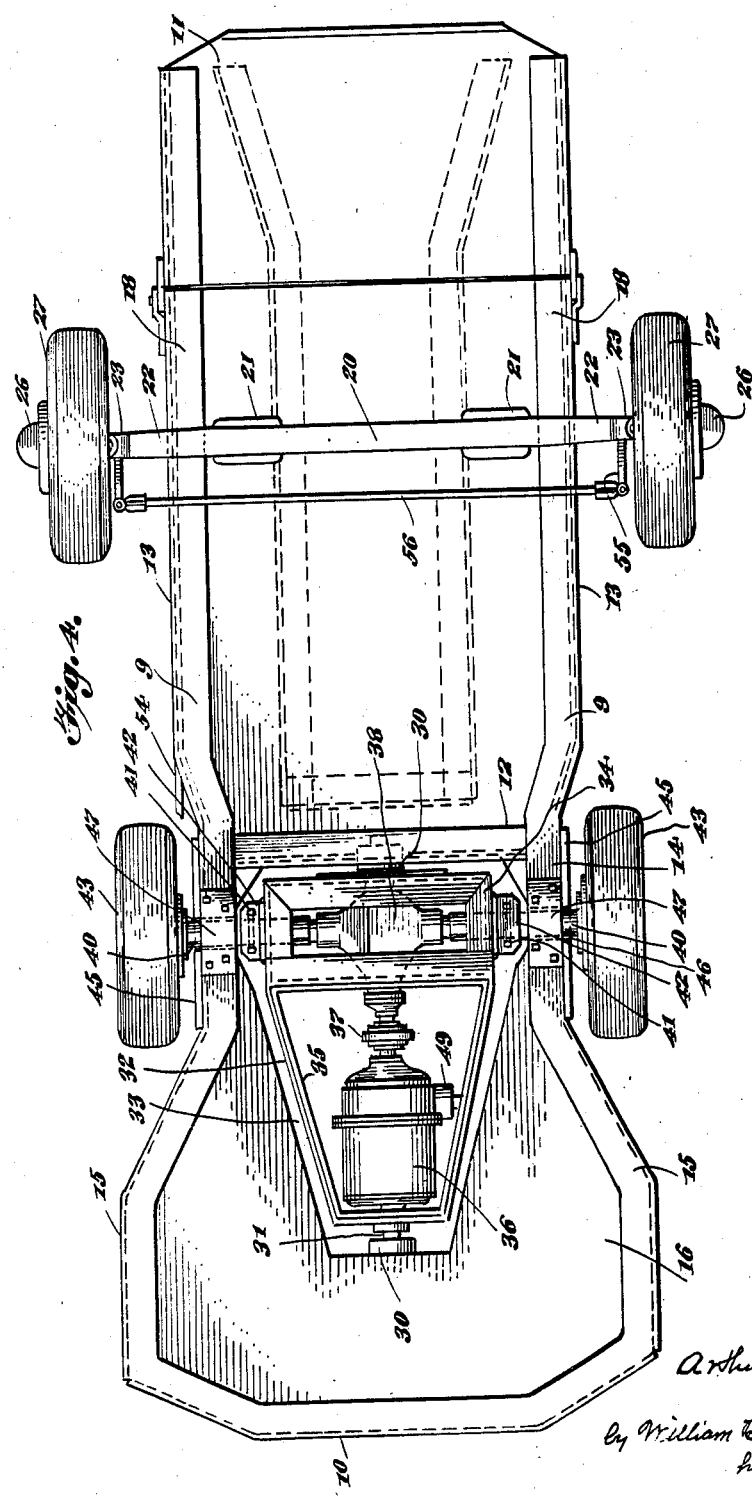

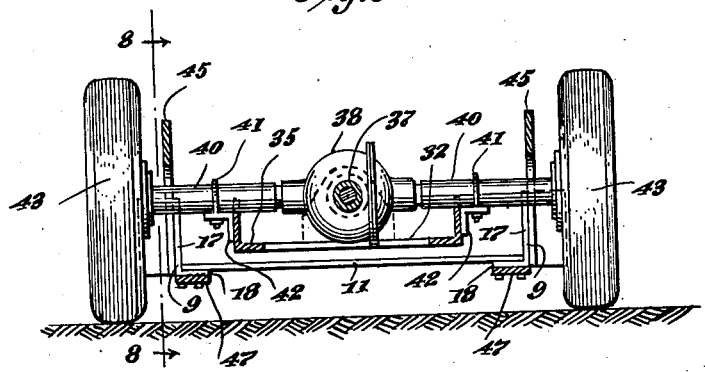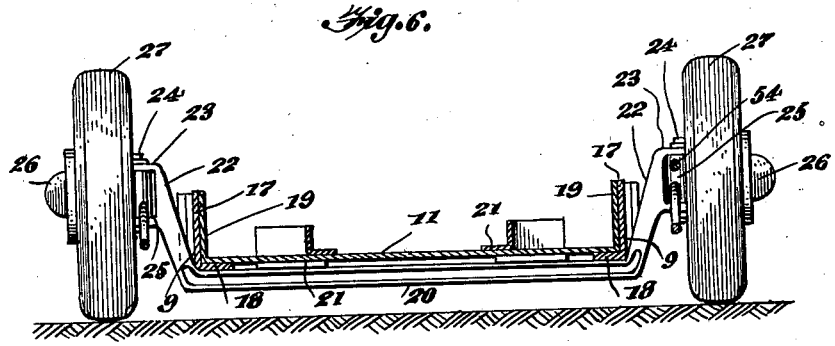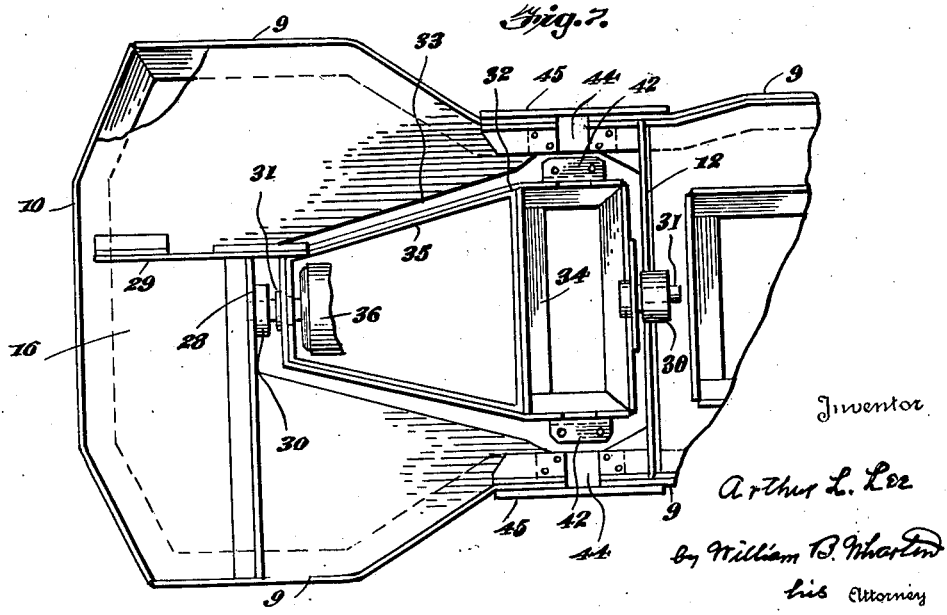

2,323,817

UNITED STATES PATENT OFFICE 2,323,817

MINING MACHINE CARRIER

Arthur L. Lee, Oakmont, Pa., assignor, by mesne assignments, to Goodman Manufacturing Company, Chicago, Ill., a corporation of Illinois Application April 9, 1941, Serial No. 387,672

5 Claims. (Cl. 180—54)

This invention relates to trucks of the kind used for transporting mining machines, particularly cutting machines, through coal mines, to and from the faces where cutting is accomplished.

The principal object of the invention is to provide in practical form a truck of this kind that is self-propelled, self-steering, and mounted on rubber tired wheels.

Trucks that have heretofore been commonly used for the same purpose have normally been of the kind operated on tracks. When a vehicle of this character is mounted on rubber tires, drastic reorganization of the vehicle is necessary, because of the differences between track and ground surfaces, and the difference in size between the small track wheels that have commonly been used and the relatively large diameter rubber tires that must be used to support the heavy loads to which such vehicles are subjected.

The chief limitations imposed by service conditions in mines are those of height and width, and these are accompanied by the necessity of providing for flexibility of the vehicle to compensate for uneven floor surfaces. Limitation in height precludes the expedient of raising the axles from the low levels permitted by the small track wheels to those required by the larger rubber tired wheels, and also precludes the insertion of rocking mountings above the axles and below the body floor, in the manner common in vehicles purposed for use above ground. In track vehicles it has been customary to space the forward and rearward wheels upon such a short base as to provide for unevenness in the track, but, when a vehicle is mounted on large rubber-tired wheels, and run directly upon a mine floor, such short wheel bases lead to longitudinal tipping of the vehicle, and the expedient of a short wheel base is therefore not practicable in such vehicle.

The herein-described vehicle overcomes these various difficulties, while providing an entirely practical truck, and one that is limited in size to the exigencies of underground use.

The chief object of this invention is to provide a mining machine-carrying truck mounted on rubber tired wheels, which is adapted to underground use.

Another important object is to provide a novel arrangement and assembly of axles, whereby, without increasing the height of the truck above that normally presented by track trucks, the wheel base of the truck is sufficiently long to provide a longitudinally stable truck.

Still another object is to provide in a rubber-tired truck having such a long wheelbase a novel axle arrangement which, without increasing the height of the truck, provides compensation for uneven floor surface and thereby avoids twisting strains on the chassis.

A further object is to provide a novel chassis structure that permits transverse rocking of the axle, and further, that permits vertical travel of the end portions of the rocking axle along paths that cross longitudinal members of the vehicle chassis, or frame, so hat the level of such frame members need not be arranged above the limits of vertical travel of the ends of the rocking axle.

In the accompanying drawings:

Figure 1 is a top plan view of a vehicle constructed in accordance with my invention.

Figure 2 is a side elevation of the same vehicle.

Figure 3 is a central longitudinal vertical section through the vehicle.

Figure 4 is a bottom plan view of the vehicle.

Figure 5 is a cross-sectional view taken in the plane of the section line 5—5 of Figure 2.

Figure 6 is a cross-sectional view taken in the plane of the section line 6—6 of Figure 2.

Figure 7 is an enlarged fragmentary plan view, showing in detail the rearward portion of the vehicle.

Figure 8 is an enlarged cross-sectional view taken in the plane of the section line 8—8 of Figure 5.

Describing the drawings in detail, the truck has a chassis, or frame, including longitudinal side elements 9, spaced apart and interconnected at their rear ends by a cross member 10. A supporting deck 11 for a mining machine is mounted between the forward portions of the members 9, and to the rear of such deck is a cross element 12 having an upstanding portion. Advantageously the members 9 comprise forward parallel reaches 13, between which the deck 11 lies, inwardly bent portions 14 forming a waist, and rearward portions 15 extending outwardly and rearwardly to embrace a deck 16 supported by the said side members and the rear cross member 10. As shown in Figures 5 and 6 the chassis elements 9, 10 and 12 are preferably angle bars, having vertical flanges 17 and horizontal flanges 18 upon which rest the decks 11 and 16. The deck 11 extends from a point a short distance in advance of the rear axle of the truck to a point in advance of the forward axle. It is of adequate size to be a bed for a mining machine.

The forward end of the chassis is supported by a drop axle including a horizontal cross-reach 20, beneath and rigidly secured to the members 9. This cross reach 20 is supportingly connected with deck 11 by means of spacers 21. The axle projects beyond the outer sides of the members 9, and has upward extensions 22 terminating in hanger brackets 23. A spindle mounting for steered movement of the forward wheels is provided by vertical pins 24, which are pivoted in the hanger brackets 23, and which mount knuckles 25 carrying stub axles 26. Rubber tired wheels 27 are mounted on the stub axles, in a position spacing them from the frame to give room for their steering movement, as is indicated in broken lines in Figure 1.

The rear of the chassis is supported by an assembly that provides rocking motion to compensate for uneven ground surface. The front of this rearward assembly is connected with the chassis by the rigid cross member 12 extended between the longitudinal frame members 9. The rear of the assembly is connected with the chassis by a transverse standard 28 mounted on the rear deck 16, as shown in Figures 3 and 7. A longitudinal standard 29 serves as a mounting bracket for a cable reel and cable guide. A pair of pivot bearings 30, spaced longitudinally of the chassis and axially aligned upon its median axis, advantageously upon an approximate level with the top surfaces of the members 9, are mounted respectively in the upstanding portion of transverse member 12 and in the standard 28.

Pivot pins 31 rotatably engage in the bearings 30, and support a cradle 32 that is arranged within the area of an approximately triangular opening 33 in the deck 16. The cradle 32 is connected with the pins 31 for tilting movement relative to the chassis structure about the axes of the pins. The cradle comprises a forward transverse rectangular frame 34 and a rearward tapering frame 35, so that it has a triangular shape corresponding generally to the triangular contour of the opening 33 in the deck.

The tapering frame 35 serves as a support for a motor 36 connected by a shaft and universal joint assembly 37, and through a differential gear assembly in a housing 38 with axles 39. The axles 39 extend through housings 40 connected with the differential housing 38, and are secured to the cradle 32 by means of U-bolts 41 that encircle the axles and engage with hangers 42 secured to the side member of the transverse frame 34 of the cradle. The differential housing and axle housings overlie the transverse forward frame 34 of the cradle. Rubber tired wheels 43 are mounted on the ends of the axles. The entire rubber tired driving assembly just described is transversely tiltable relative to the chassis, being rigidly secured to the cradle 32 upon which it is mounted and tilting therewith about the axes of the pivot pins 31.

Because of the necessity of maintaining the vehicle within rigid limits of height, and at the same time providing bottom clearance and permitting rocking motion of the power assembly just described, the cradle-mounted power assembly is arranged at such level that in rocking movement of the cradle the axle housings pass through the horizontal plane in which the longitudinal frame members lie. For this reason the frame members 9 are, at the points of crossing by the axles, divided and spaced apart longitudinally to provide between their ends a space, designaed 44 in Figure 3, in which the axle housings 40 may move. To give the necessary rigidity to the members 9, the two parts of both side members 9 are connected by plates 45, best shown in Figure 8. Each plate 45 is rigidly secured to the end portions of the frame member 9 upon opposite sides of the space 44, and is of substantially greater height than the member 9 to which it is secured. Between the parts of the divided frame member 9 and extending from the level of the bottom of such member to a level above its top each plate has a slot 46 through which extends the axle housing 40, the housing being thereby permitted to swing between limits adjacent the bottom and above the tops of the frame members 9. Above the slot 46 each plate 45 is continuous and constitutes a rigid connection between the divisions of the member 9 with which it is associated. A plate 47 extends horizontally across the bottom of the space 44 and slot 46, and is bolted to the bottom of the horizontal flanges 18 of the portions of the frame members 9 at both sides of the space 44 and slot 46.

It will be seen from consideration of Figure 4 that upon disengagement of the pivot connections 31, 31, and removal of the plates 47, the entire motor and axle assembly, being mounted on the cradle 32, can be removed from the chassis as a unit by downward movement relative to the chassis.

Referring to Figure 1, it will be seen that on the deck 16 is mounted, to one side of the cradle 32, a cable reel 48 which may be operated from the motor 36 by a take-off 49, while on the opposite side of the cradle is mounted an operator's seat 50, a steering wheel 51, and a controller box 52 by means of which the motor 36 is operated. The steering wheel is connected through a gear box 53 and drag link 54 that extends alongside one of the side members 9, with a steering lever 55 secured to one of the steering knuckles 25, and a radius rod 56 connects the opposite knuckle for simultaneous steering of the wheel 27. The mechanisms mounted upon the deck 16 are of such height that their tops are all below the uppermost part of a mining machine mounted upon the forward deck 11.

The above-described structure presents a truck that is entirely practicable in construction and operation, and one that complies with all requirements for mine use. The position of the bed that carries a mining machine on the forward underslung axle, permits the mounting of such machine at substantially the same height as in prior track vehicles wherein the axles have been located beneath the body and on a level with the wheel hubs. The suspension of the rear portion of the body gives the advantages of a high axle, namely, it permits power to be transmitted to the axle from a central drive shaft and also permits the use of the rocking rear axle assembly, and consequently three point suspension of the chassis and the advantage of stability, while the arrangement of the mechanism avoids the necessity of the mining machine-carrying bed of the vehicle being arranged at a level to overlie such an assembly.

The spaces 44, that separate the members 9 into two portions, not only provide clearance for the axles in their transverse rocking, but also permit the axles to be arranged upon a level higher than the bottoms of the members 9. It is, therefore, unnecessary that such members be arranged upon a level sufficiently high to permit them to extend over the axles. The use of slotted plates 45 with the divided members 9 gives rigidity to the longitudinal frame members 9, while permitting the axles to intersect the plane of those members in rocking movement of the axle and motor carrying cradle.

I claim as my invention:

1. A mining machine-carrying truck comprising a spaced pair of axles having wheels mounted thereon, one of said axles being underslung, a chassis comprising a machine-carrying deck structure carried by said underslung axle between the wheels mounted on said axle, said deck extending to a point between said axles, said truck chassis also including a supporting frame that extends from said deck to a point beyond the other axle, a platform pivoted to said supporting frame upon an axis that is arranged longitudinally of the chassis, and connecting means supporting said platform rigidly upon said second axle, said second axle being arranged upon a level higher than said platform and said deck.

2. In a mining machine-carrying truck comprising spaced pairs of wheels and a chassis in underslung relation to said wheels; an axle structure arranged beneath and in supporting relation to the chassis between one pair of wheels, an axle arranged above the chassis extending between the other pair of wheels, means connecting the truck chassis with said second axle for relative tilting movement, a mining machine-carrying deck supported by the chassis and arranged upon a level above the said first axle and below the said second axle, said deck extending from a point between the axles to a point beyond the one that is lower, and driving mechanism mounted upon the said second axle for tilting movement therewith relative to the chassis, said driving mechanism being operatively connected with the wheels carried by the said second axle.

3. In a mining machine-carrying truck that includes longitudinal chassis elements, a platform dismountably pivoted to the chassis upon a longitudinal axis and a motor and axle structure mounted on the platform; a deck provided with an opening, the said deck being permanently mounted on the chassis and the platform being arranged within the area of the opening, and controlling means for the motor mounted on the said deck.

4. A mining machine-carrying truck including a pair of axles spaced longitudinally of the machine and having wheels mounted thereon, one of said axles being underslung, a longitudinal frame extending above and mounted on said underslung axle, and also extending beneath the level of the second axle, the portion of said frame above said first named axle extending in advance of said second axle constituting a machine-carrying deck, and a platform structure disposed rearwardly of said deck portion, having said second axle supported in fixed relation thereto and being pivotally connected to said frame for transverse tilting movement relative to the latter.

5. A mining machine-carrying truck in accordance with claim 4 wherein a drive motor is mounted on the platform structure in operative connection with said second axle.

ARTHUR L. LEE.